United States Patent Office 3,278,257
Patented Oct. 11, 1966

3,278,257
PROCESS FOR THE TREATMENT OF METALLIC COMPOUNDS WITH OCTACHLOROCYCLOPENTENE
Sheppard Young Tyree, Jr., and Francis Nash Collier, Jr., Chapel Hill, N.C., and James S. Sconce, Niagara Falls, N.Y., assignors to Hooker Chemical Corporation, Niagara Falls, N.Y., a corporation of New York
No Drawing. Filed July 15, 1964, Ser. No. 382,949
8 Claims. (Cl. 23—85)

The present invention relates to a novel process for the treatment of metal containing compounds with octachlorocyclopentene.

It is known that minerals containing metallic oxides and/or metallic sulfides can be treated with chlorine and carbontetrachloride to form metallic chlorides and oxychlorides. These reactions, however, generally require high temperatures and pressures. Further, the reactants particularly the chlorine and carbontetrachloride, are toxic and are therefore difficult to process, especially at high temperatures.

It is thus an object of the present invention to provide a superior novel process for the treatment of minerals, with a chlorocarbon of low toxicity and high solvent power. This and other objects will become apparent from a reading of this specification.

In accordance with the present invention there is provided a novel process for the preparation of compounds selected from the group consisting of metallic chlorides and metallic oxychlorides, which comprises contacting and reacting octachlorocyclopentene with a compound selected from the group consisting of metallic oxides and metallic sulfides. The specific reactions occurring can be illustrated by the following equations which are not intended to be limiting:

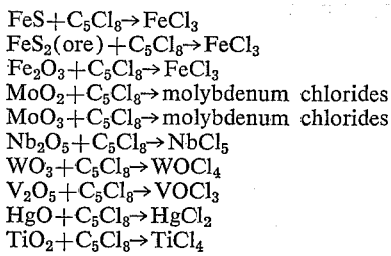

$$FeS + C_5Cl_8 \rightarrow FeCl_3$$
$$FeS_2(ore) + C_5Cl_8 \rightarrow FeCl_3$$
$$Fe_2O_3 + C_5Cl_8 \rightarrow FeCl_3$$
$$MoO_2 + C_5Cl_8 \rightarrow \text{molybdenum chlorides}$$
$$MoO_3 + C_5Cl_8 \rightarrow \text{molybdenum chlorides}$$
$$Nb_2O_5 + C_5Cl_8 \rightarrow NbCl_5$$
$$WO_3 + C_5Cl_8 \rightarrow WOCl_4$$
$$V_2O_5 + C_5Cl_8 \rightarrow VOCl_3$$
$$HgO + C_5Cl_8 \rightarrow HgCl_2$$
$$TiO_2 + C_5Cl_8 \rightarrow TiCl_4$$

The metallic ion may be any metal which is stable to the reaction condition and, thus, will not adversely affect the reaction mechanism, such as, for example, iron, mercury, vanadium, rhenium, niobium, molybdenum, tungsten, and the like. These metallic ions are employed in the reaction in the form of their oxides, sulfides, complexes, and the like. Thus, for example, ferric oxide, mercuric oxide, vanadium pentoxide, molybdenum oxide, iron sulfides, niobium pentoxide, pyrites, and the like, are examples of the starting metallic compound reactants utilized in the practice of the present invention.

The temperature employed to effect the reaction described herein above 100 degrees centigrade and, generally, is in the range of from 150 degrees centrigrade to about 300 degrees centigrade. Temperatures higher than 300 degrees centigrade can be utilized but are dependent upon the starting reactants and the product desired.

The molar ratio of reactants will depend upon the products desired, the reactants employed and the amount of chlorocarbon used as solvent. However, the molar ratio of octachlorocyclopentene to metal containing compound is, generally, in the range of from about 5 to 100 parts of octachlorocyclopentene per part of metal containing compound, with the preferred range being from about 4–20 parts to one.

Although a solvent other than octachlorocyclopentene is not normally necessary to effect the reaction, in order to facilitate the reaction a solvent may be employed. Illustrative solvents include inert halogenated aliphatic solvents, such as, carbon tetrachloride, tetrachloroethylene, hexachlorobutadiene, and the like.

The pressures employed to accomplish the reaction are, generally, atmospheric; however, super- and sub-atmospheric pressures can be employed, e.g., from .1 to 20 atmospheres.

The products prepared in accordance with the process of the present invention are obtained from the reaction mixture by general methods known in this art, such as crystallization, sublimation, liquid-liquid extraction and evaporation. Further, the products can be purified by crystallization and distillation techniques, if desired. Identification of the products was effected by ultimate chemical analysis and/or infrared spectra analyses.

The octachlorocyclopentene reactant utilized in the practice of the process of the present invention can be prepared by reacting a polychloropentene having an average chlorine content of more than 2 atoms per molecule with chlorine in a reaction zone containing a porous surface active catalyst, maintained at a temperature between about 250 degrees centigrade and about 550 degrees centigrade.

The following examples are given to illustrate the practice of the present invention, but are not intended to be construed as limiting thereof.

In the specification, examples and claims, parts are by weight and temperatures are in degrees centigrade unless otherwise stated.

Example 1

Two parts of tungsten trioxide were placed in a flask and 15 parts of octachlorocylopentene were added. The flask was heated at a temperature of 255 degrees centigrade, and at such a rate that after refluxing had begun, tungsten-oxytetrachloride crystals begin to form two-thirds of the way up the condenser. The product is obtained by filtration and washing with small amounts of dry carbon tetrachloride. After collection and purification of the product, 4.54 parts of tungsten oxytetrachloride are obtained, a yield of 77 percent.

Analysis for tungsten oxytetrachloride ($WOCl_4$):

| Theoretical— | Percent |
|---|---|
| W | 53.480 |
| Cl | 41.50 |
| Found— | |
| W | 53.82 |
| Cl | 41.41 |

Example 2

In the manner of Example 1, tungsten oxytetrachloride ($WOCl_4$) was prepared by employing in the place of tungsten trioxide, an equivalent amount of tungsten dioxide. By employing 5.3 parts of tungsten dioxide, a yield of 6.2 parts of tungsten oxychloride was obtained after purification, corresponding to a 75 percent yield. The product was identified by elemental analysis.

Example 3

The procedure of Example 1 was repeated, employing ferric oxide in place of tungsten trioxide, resulting in the production of ferric chloride. Two parts of ferric oxide together with 20 parts of octachlorocyclopentene were heated at a temperature of 255 degrees centigrade for a period of 15 minutes. The product was collected by filtering, washing with $CCl_4$, and subliming down a hot tube and resulted in obtaining 2.8 parts of product (70 percent yield).

Example 4

The procedure of Example 1 was repeated, employing vanadium pentaoxide in place of tungsten trioxide, to produce vanadium oxytrichloride. Two parts of vanadium pentaoxide and 20 parts of octachlorocyclopentene were heated at a temperature of 255 degrees centigrade for a period of 15 minutes. The product was collected by filtration and was purified by distillation at 126 degrees. 3.0 parts of product (80 percent yield) were obtained and the product was identified by chemical analysis for chlorine and vanadium by using infrared techniques.

Example 5

2.0 parts of iron sulfide (FeS) and 20 parts of octachlorocyclopentene were refluxed for 20 minutes. On subliming the solid product of the reaction, 2.8 parts of green crystals were recovered, which weight corresponds to an 80 percent yield of ferric chloride ($FeCl_3$).

Analysis:

Theoretical (calculated for ferric chloride)—

|  | Percent |
|---|---|
| Fe | 34.4 |
| Cl | 65.6 |

Found—

|  |  |
|---|---|
| Fe | 34.4 |
| Cl | 65.8 |

Example 6

2.0 parts of iron pyrite, $FeS_2$, and 20 parts of octachlorocyclopentene were refluxed for 15 minutes at 250 degrees centigrade. The mixture was then filtered, washed with carbon tetrachloride and sublimed in a hot tube at a temperature of about 100 degrees centigrade. Anhydrous ferric chloride in 75 percent yield is obtained after purification of the product by distillation.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for the preparation of compounds selected from the group consisting of metal chlorides and metal oxychlorides which comprises chlorinating a compound selected from the group consisting of metal oxides and metal sulfides with octachlorocyclopentene at a temperature of at least 100 degrees centigrade wherein the metal of said metal oxide and sulfide is selected from the group consisting of iron, mercury, vanadium, rhenium, niobium, molybdenum, tungsten and titanium.

2. A process in accordance with claim 1, wherein the reaction is effected at a temperature above 100 degrees centigrade.

3. A process in accordance with claim 1 wherein a weight ratio of 5 to 100 parts of octachlorocyclopentene per part of said metal compound is employed and the chlorination is effected at a temperature of from about 250 degrees centigrade to 300 degrees centigrade.

4. A process in accordance with claim 1, wherein the metal oxide is tungsten trioxide.

5. A process in accordance with claim 1, wherein the metal oxide being employed is ferric oxide.

6. A process in accordance with claim 1, wherein the metal sulfide is iron sulfide.

7. A process in accordance with claim 1, wherein an inert halogenated aliphatic solvent is employed.

8. A process in accordance with claim 7, wherein the solvent is carbon tetrachloride.

References Cited by the Examiner
UNITED STATES PATENTS

| 2,742,506 | 4/1956 | Maude et al. |
| 2,786,062 | 3/1957 | Vollman. |
| 2,859,097 | 11/1958 | Davidson et al. |

OSCAR R. VERTIZ, *Primary Examiner.*

E. STERN, *Assistant Examiner.*